United States Patent
Ekchian et al.

(10) Patent No.: US 7,485,992 B2
(45) Date of Patent: Feb. 3, 2009

(54) ARMATURE TYPE ELECTRICAL GENERATORS FOR SELF POWERED CELL PHONES

(75) Inventors: Jack A. Ekchian, Belmont, MA (US); Berj A. Terzian, Newbury, MA (US)

(73) Assignee: Incelex, LLC, Newbury, MA (US)

( * ) Notice: Subject to any disclaimer, the term of this patent is extended or adjusted under 35 U.S.C. 154(b) by 466 days.

(21) Appl. No.: 11/191,890

(22) Filed: Jul. 28, 2005

(65) Prior Publication Data

US 2007/0024233 A1 Feb. 1, 2007

(51) Int. Cl.
H02K 33/00 (2006.01)
H02K 7/10 (2006.01)
H02K 1/22 (2006.01)
H02J 7/00 (2006.01)
H02J 7/14 (2006.01)

(52) U.S. Cl. .............. 310/37; 310/36; 310/38; 310/75 A; 310/78; 310/268; 320/107; 320/123

(58) Field of Classification Search ............. 310/15–24, 310/75 A, 78, 36–38; 290/1 A–1 E; 320/107, 320/123

See application file for complete search history.

(56) References Cited

U.S. PATENT DOCUMENTS

| | | | |
|---|---|---|---|
| 3,204,110 A | 8/1965 | Yoshio | |
| 3,231,749 A | 1/1966 | Hinck, III | |
| 4,260,901 A | 4/1981 | Woodbridge | |
| 4,409,992 A * | 10/1983 | Sidorenko et al. | 600/595 |
| 4,423,334 A * | 12/1983 | Jacobi et al. | 290/53 |
| 4,821,218 A | 4/1989 | Potsch | |
| 5,271,328 A | 12/1993 | Boulais et al. | |
| 5,941,692 A | 8/1999 | Olney et al. | |
| 5,949,215 A * | 9/1999 | Takakura | 320/114 |
| 6,020,653 A | 2/2000 | Woodbridge et al. | |
| 6,172,426 B1 | 1/2001 | Galich | |
| 6,737,829 B2 * | 5/2004 | Sastry | 320/101 |
| 6,791,205 B2 | 9/2004 | Woodbridge | |
| 6,978,161 B2 * | 12/2005 | Tu et al. | 455/573 |
| 2004/0222637 A1 | 11/2004 | Bedyak | |
| 2004/0222638 A1 | 11/2004 | Bedyak | |

* cited by examiner

Primary Examiner—Akm E Ullah
Assistant Examiner—Richard V Muralidar
(74) Attorney, Agent, or Firm—Lucas & Mercanti, LLP

(57) ABSTRACT

Self powered cell phones are provided with an armature which is supported to freely oscillate in swinging opposite motions and which includes a wire coil configured to intersect the magnetic flux of a permanent magnet during such motions, which generates electrical voltage and current that can be used to operate the phone or charge or recharge its batteries. Recharging mechanisms are manually or flywheel operated to impart the armature's motions and supply the generated current to the cell phone batteries.

29 Claims, 5 Drawing Sheets

ARMATURE TYPE ELECTRICAL GENERATORS FOR SELF POWERED CELL PHONES

BACKGROUND OF THE INVENTION

1. Field of the Invention

This invention relates to armature type electrical generators that are useful as power sources for self powered cell phones. That is to say, such generators can be installed within the housing of cell phones to serve as internal sources of electrical power that will operate the cell phones, thus avoiding the need for external electrical power either to operate or recharge such phones.

2. Disadvantages in Prior Practice

Relevant technology to the present invention is described in earlier filed copending application Ser. No. 11/120,255, entitled SELF POWERED CELL PHONES, and Ser. No. 11/133,093, entitled AUTOMATED MOTION PROVIDER FOR SELF POWERED CELL PHONES, the disclosures of which are incorporated herein by reference. Generally, those applications teach technologies that are based on forming hollow tracks or raceways of various shapes and wrapping them with conductive wire coils. Sealed within the raceways are permanently magnetic members having shapes complementary to the raceway cross sections, which allows the members to traverse through the raceways when such assemblies are put into physical motion. As a result, magnetic flux passes through the wire coils to electromagnetically generate electrical voltage and current in the wire coils. Such assemblies can be installed within cell phone housings to function as internally generated electrical power for operating the cell phone circuits and/or recharging the phone's batteries.

These electrical generators rely upon motion of the magnetic components, shaped like balls, cylinders or bars, through the hollow raceways that are attached in fixed positions within the cell phone housings. Therefore, the manufacturing tolerances of such components have to be closely controlled to optimize the physical motion of the magnetic members relative to the immobile tracks or raceways. Also, fabrication of the raceways and sealing the magnetic members within them is relatively costly. Moreover, if any malfunction develops within the sealed raceway, it has to be either broken open for repair or discarded and replaced by a new assembly of the components, including the wire coils, thus causing further cost and complexity.

SUMMARY OF THE INVENTION

The present invention avoids the above discussed disadvantages of the earlier described technology because, instead of using sealed raceways with moving magnetic members within them, the invention relies upon stationary magnetic circuits fixed within cell phones which interact with oscillating electrical armatures to generate internal electrical power that can be readily adapted for operating and recharging cell phones. In addition, the present invention includes a variety of new mechanical drive systems for imparting optimum motion to the electrical armatures, which will quickly restore a full electrical charge in cell phone batteries within a relatively short time period. Finally, by fabricating the armatures in the form of freely swinging pendulums, recharging electrical current is nearly continuously generated in the phone when carried on the body of a user, thus minimizing or avoiding the need for a separate recharging of depleted batteries.

BRIEF DESCRIPTION OF THE DRAWINGS

Further details of the invention will be readily understood by reference to the accompanying drawings and description, wherein:

In the ensuing description, the same or similar components in the various figures will be marked with the same reference numerals without repetition of the initial detailed identification of each component.

Referring to FIG. 1, this cross section through the depth of a cell phone includes an outer housing 10, operating buttons 12, and a display screen 14. Also included are dual magnetic circuits composed of disc shaped permanent button magnets 16, 18, disposed within U-shaped pole pieces 20, 22 made of iron or other paramagnetic material. These magnetic circuits provide air gaps 24, 26 which are bridged by magnetic fluxes conducted by the pole pieces 20, 22 and having the polarities of the flat opposite surfaces of the button magnets 16, 18. The magnetic circuits are supported in a fixed position within the interior of housing 10.

Figure 1:
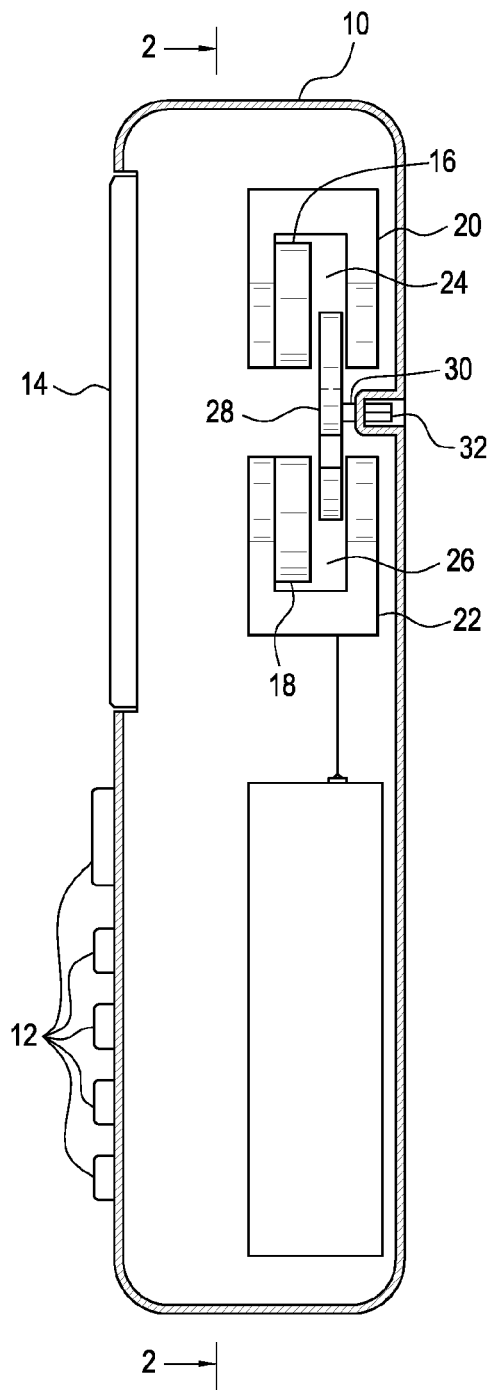
FIG. 1 is a cross sectional view through the depth of a cell phone oriented vertically with its base at the bottom, its height at the top, and its display screen and operating buttons facing leftward.

An armature 28 is provided for interaction with the magnetic circuits to enable generation of electric current. The armature has a central shaft 30 that extends into the cavity of a recess 32 formed in the back wall of housing 10. The extension is supported by a bearing which allows the armature to freely rotate and oscillate in opposite swinging motions. The extended end of shaft 28 has one or more flats on its surface for functionality as the male component of a coupling, as later explained below.

The opposite ends of armature 28 are disc shaped with diameters generally similar to those of the button magnets 16, 18. Mounted on each of the armature's ends are coils of conductive wire or other conductive material 34, 36 that can pass through the magnetic flux of the magnetic circuits as the central shaft pivots and induces the armature to oscillate or rock in swinging pendulum-like motions relative to the cell phone casing. For this purpose, the lower end of armature 28 in FIG. 2 includes a weight 38 placed at its center which creates an imbalance that causes the armature to orient itself in a vertical position, like an undisturbed pendulum. To facilitate illustration and explanation, the armature in FIG. 2 has been angularly displaced from its vertical rest position to enable viewing the coils and other components that participate in generating electric current.

Each of the wire coils 34, 36 ends in a pair of output terminals 40, 42 to which are connected coiled leads that can flex and accommodate swinging motions of the armature 28. These leads deliver, in parallel, the electric current generated in each coil 34, 36 to connecting leads 44, 46 that conduct the electric currents to input terminals 48, 50 of a battery pack 52. The battery pack 52 contains rechargeable batteries, e.g., lithium ion or nickel metal hydride, nickel cadmium types, or capacitors that can be recharged by the electric currents delivered by conductors 44, 46.

Figure 2:
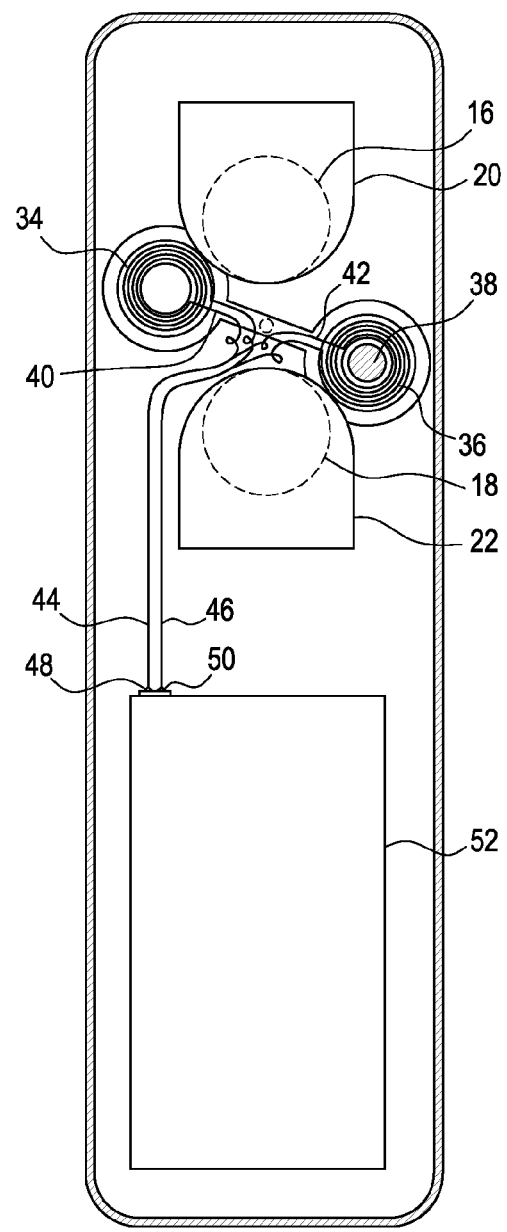
FIG. 2 is a cross sectional view through the cell phone's width taken along the plane 2-2 of FIG. 1.

The construction and functionality of the device illustrated in FIGS. 1 and 2 will be comprehensible to those skilled in the art from the foregoing description. The pendulum-like armature 28 will hang in a vertical position with its ends and wire coils disposed in the air gaps 24, 26 of the magnetic circuits when the cell phone is standing on its base. When the armature moves out of such alignment due to relative motion between its ends and the magnetic pole pieces 16, 18, electrical voltage and current will be generated in the wire coils 34, 36 by the Faraday effect. Accordingly, when a user walks, runs, rides a bicycle, exercises or otherwise moves with a cell phone carried in a holster or pocket on his or her body, containing the device of FIG. 2, recharging of the cell phone batteries will repeatedly occur during the course of such activity. Depending on the frequency and length of the recharging events, a cell phone can be kept operable for communications throughout an entire day, without need for a separate recharging cycle. However, if recharging becomes necessary, it can be carried out by manually moving the cell phone in reciprocal rocking motions which will cause the magnetic flux in the air gaps 24, 26 to periodically intersect the coils 34, 36 of the relatively stationary armature 28, thus generating recharging electric current, as previously described.

The structure of the armature can be, and preferably is, a multi-layered printed circuit board (PCB) having the coils 34, 36 etched and printed thereon. For example, if a single layer of the armature contains a total of 250 turns of coil formed by the dual coils 34, 36, a four-layered PCB will provide 1,000 turns of coil for optimum generation of electric recharging currents that will maintain, reasonably charged, present day cell phones which, at full charge, are rated generally to provide 900-milliamp hours of power at approximately 3.6 volts.

Figure 3:
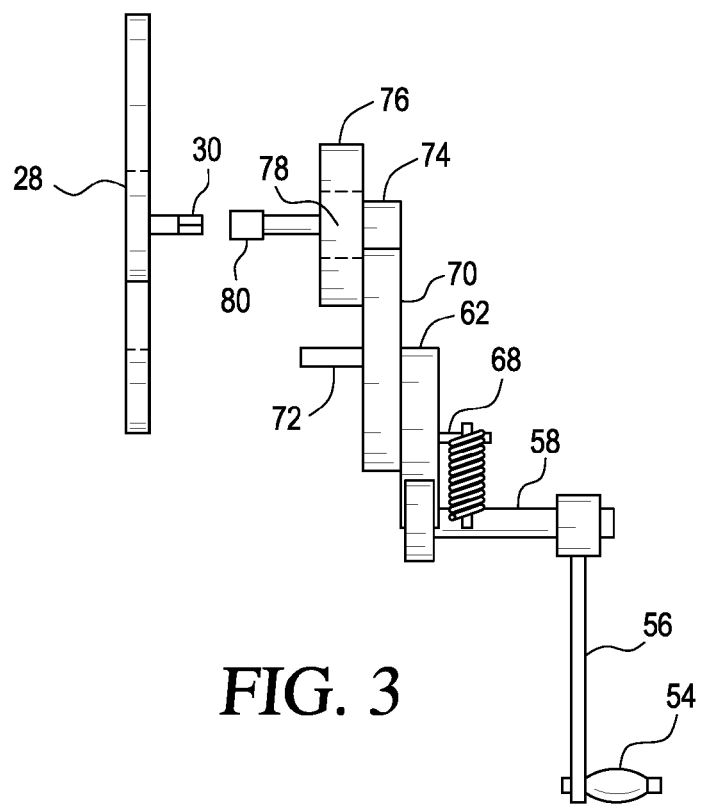
FIG. 3 is a side elevational view of a mechanical drive system for imparting rocking motion to an electrical armature.
Figure 4:
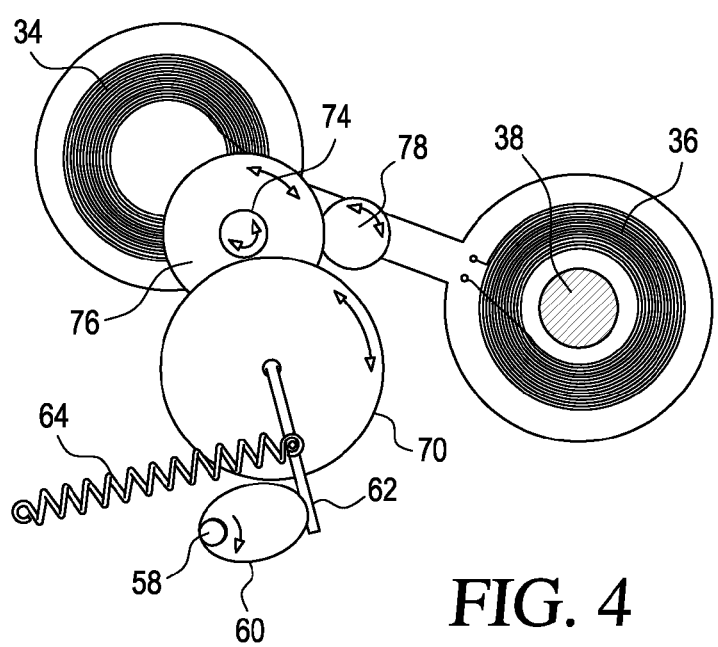
FIG. 4 is a front elevational view of the elements in FIG. 3 system rotated 90° to the left.

Referring to FIGS. 3 and 4, they portray the functional components of a rapid recharging mechanical drive system for imparting rocking motion to the armature 28 of the cell phone illustrated in FIGS. 1 and 2 for generation of electrical current, as previously explained. In particular, crank handle 54 is pivotally linked to a crank 56 which is attached to a cam input shaft 58. The cam input shaft 58 is attached to one end of the major axis of an oval shaped cam 60.

A cam follower rod 62 is kept in contact with cam 60 by coil spring 64, looped at the right end around pin 68 extended outwardly from the central axis of follower rod 62 and connected at its other end to a stationary post (not shown).

Cam follower rod 62 is attached to input gear 70 which is linked to a centrally positioned pivotable shaft 72. Input gear 70 meshes with a transmission gear 74 which is affixed to transmission gear 76. Transmission gear 76 meshes with output gear 78 which includes a central shaft 80 having one or more internal flats at its free end which match and mate with corresponding exterior flats of armature 28's shaft extended end 30 into the recess 32 (FIG. 1). Thus, when end 80 of the drive system is coupled to the extended end 30 of armature shaft 28, the motion generated by rotating crank handle 54 and crank 56 is transmitted through this coupling to the armature 28.

In particular, rotation of the crank 56 will cause cam 60 to rotate eccentrically about the axis of cam input shaft 58. As a result, cam 60 will alternately oscillate cam follower 62 and input gear 70 about the axis of shaft 72 in reciprocal opposite rocking motions which will be transmitted to transmission gear 76 and output gear 78. The coupling formed by ends 30 and 80 will, in turn, transmit corresponding rocking motions to armature 28, thus initiating and carrying out current generation for as long as the crank 56 is maintained in rotation.

Preferably, the gear ratio between input gear 70 and transmission gear 76 is 5:1, and the ratio between transmission gear 76 and output gear 78 is 2:1. Therefore, the total mechanical advantage is 10:1, whereby for every half revolution of cam 60 in FIGS. 3, 4, there will be a 14 degree swing of the cam follower 62 and a 140 degree rotation of output gear 78. This accomplishes two important benefits. First, the recharging process is accelerated, so that all other factors being equal, the time of rotation of crank 56 to develop a full charge in the batteries is reduced. Secondly, the oscillations provided to armature 28 will be regular and symmetrical, thus optimizing smoothing of the electrical currents generated during the recharging process.

In this connection, as the armature 28 oscillates in opposite directions, the polarity of the electric current will fluctuate between positive and negative. Therefore, in order to capture and convert the negative cycles to positive, a full wave diode rectifier, disclosed in Ser. No. 11/120,255, may be included in the leads 44, 46 (FIG. 1), thus creating a DC current supplied to the input terminals of battery pack 52. The battery pack may contain one or more batteries or capacitors and rectifier circuitry.

Figure 5:
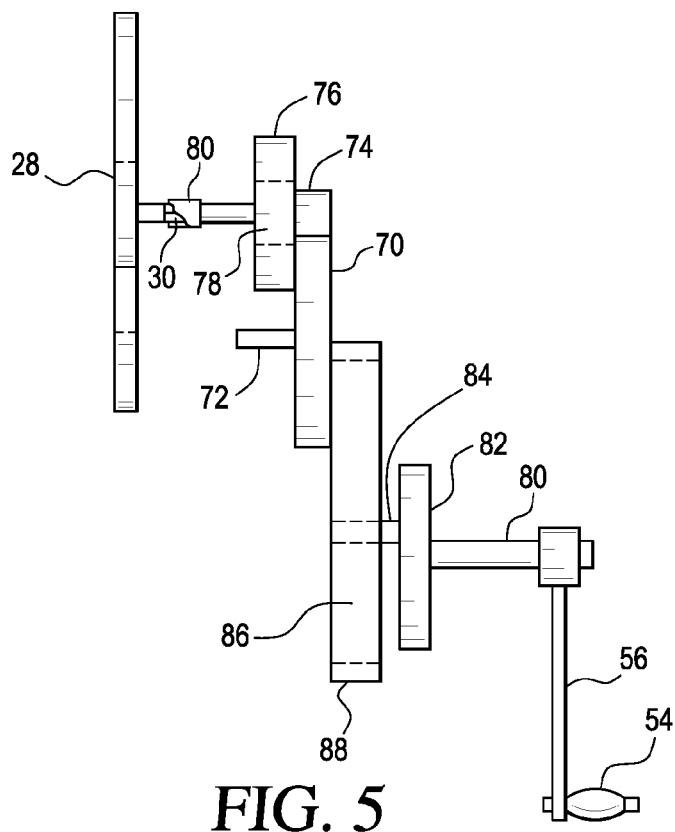
FIG. 5 is a side elevational view, similar to FIG. 3, illustrating an alternative system for rocking the electrical armature.
Figure 6:
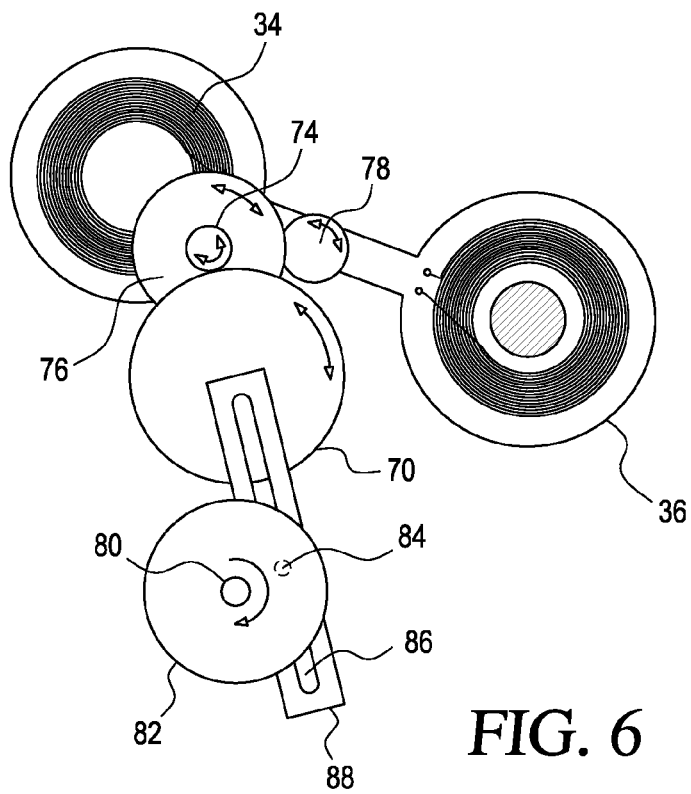
FIG. 6 is a front elevational view, similar to FIG. 4, of the FIG. 5 system.

Referring to FIGS. 5 and 6, they portray an alternative rapid recharger embodiment which is similar to the previous embodiment of FIGS. 3 and 4, the principal difference being substitution of a slider-crank mechanism in the alternative embodiment for the cam and cam follower arrangement of the previous embodiment.

In particular, crank 56 and crank handle 54 are connected to a rotatable axle 80 and wheel 82. On the opposite side, wheel 82 is attached to a pin 84 disposed in the slot 86 of a pivotable track 88 and radially spaced from the center of wheel 82.

Track 88 is attached to input gear 70, which, in turn, meshes with the transmission gear 74 which is affixed to transmission gear 76, and the latter meshes with output gear 78. The central shaft of the latter couples through its female end 80 with the male end of extended armature shaft 30, by use of complementary mating flats, as previously described in the discussion of FIGS. 3 and 4. The weight 38 of the previous embodiment is omitted in FIG. 4, since other forms of weights can be used in other locations to form a pendulum functionality in armature 28.

To operate the FIGS. 5 and 6 embodiment, a user rotates crank 56 and crank handle 54. As pin 84 travels through slot 86 of rack 88, input gear 70 is caused to pivot in alternate arcs of opposite directions, thus providing a rocking motion to the armature 28 by the same interactions of the remaining common parts, as previously described for the FIGS. 3 and 4 embodiment. The advantages of the alternative embodiment depicted in FIGS. 5 and 6 include elimination of greater rubbing friction encountered with the cam and cam follower of the previous embodiment. Also, the higher friction and stress inherent in the eccentric rotation of the cam against the cam follower is avoided. The gear ratios in the alternative embodiment are preferred to be the same as those described for the previous embodiment, in order to achieve similar advantage in the alternate design.

Figure 7:
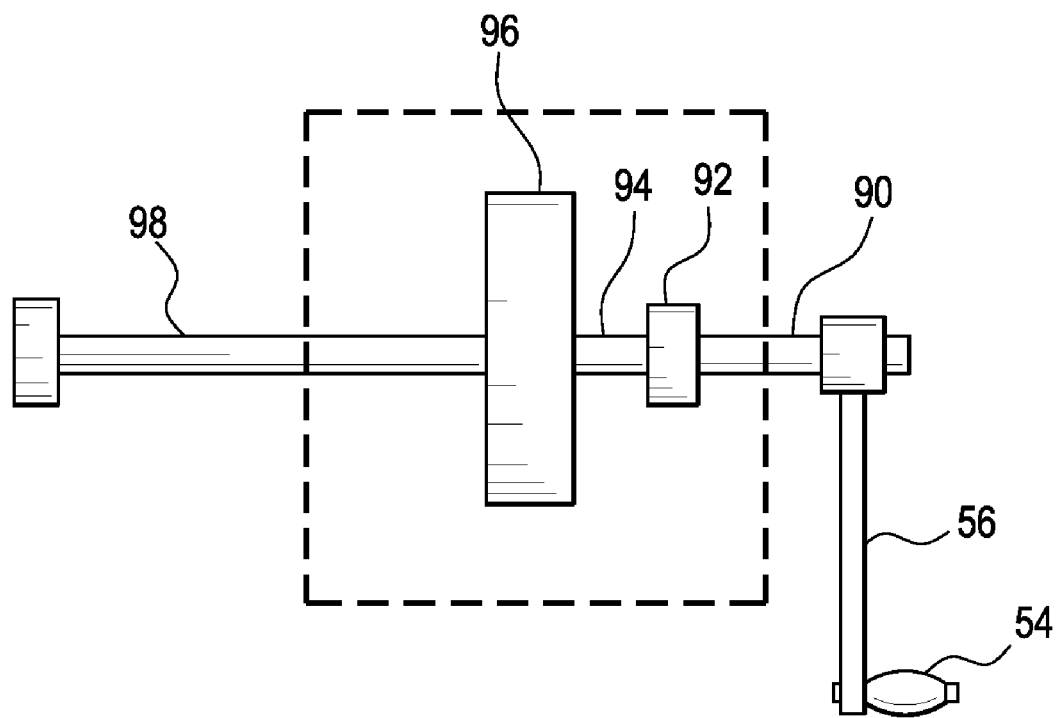
FIG. 7 is a schematic view of a drive mechanism for the recharging mechanical drive system for the cell phone.

Referring to FIG. 7, this portrays a mechanism which is useful for avoiding continuous manual cranking of the drive systems described in connection with FIGS. 1-4. It will be evident to those skilled in the art that when cranking of the previous embodiments ceases, so will the oscillations of the armature 28 and current generation terminate. These stop and go manifestations are overcome by the device illustrated in FIG. 7.

In particular, crank 56 and crank handle 54 are connected to rotatable input shaft 90. Shaft 90 is connected to a unidirectional clutch 92 which engages when shaft 90 is rotated in one direction, e.g. clockwise, and disengages when the cranking ceases.

The output shaft 94 from clutch 92 connects to a flywheel 96. An output shaft 98 of the flywheel connects either to the cam input shaft 58 of FIGS. 1 and 2, or to the axle 80 of wheel 82 in FIGS. 3 and 4. Thus, a user can rotate crank 56 and crank handle 54 to initiate engagement of clutch 92 which couples together the input and output shafts 90, 94, thus initiating rotation of the flywheel 96. After the flywheel is cranked up to its maximum angular rotational and cranking can stop to disengage the clutch 92 and enable the flywheel to run freely until its free wheeling capability runs down. During this period, there will be continuous oscillation of armature 26 in either of the drive systems of FIGS. 1 and 2 or 3 and 4. The user thereafter can repeat cranking up the flywheel into free wheeling operation for as many times as may be needed to restore either a partial or full recharge of the cell phone batteries.

Figure 8:
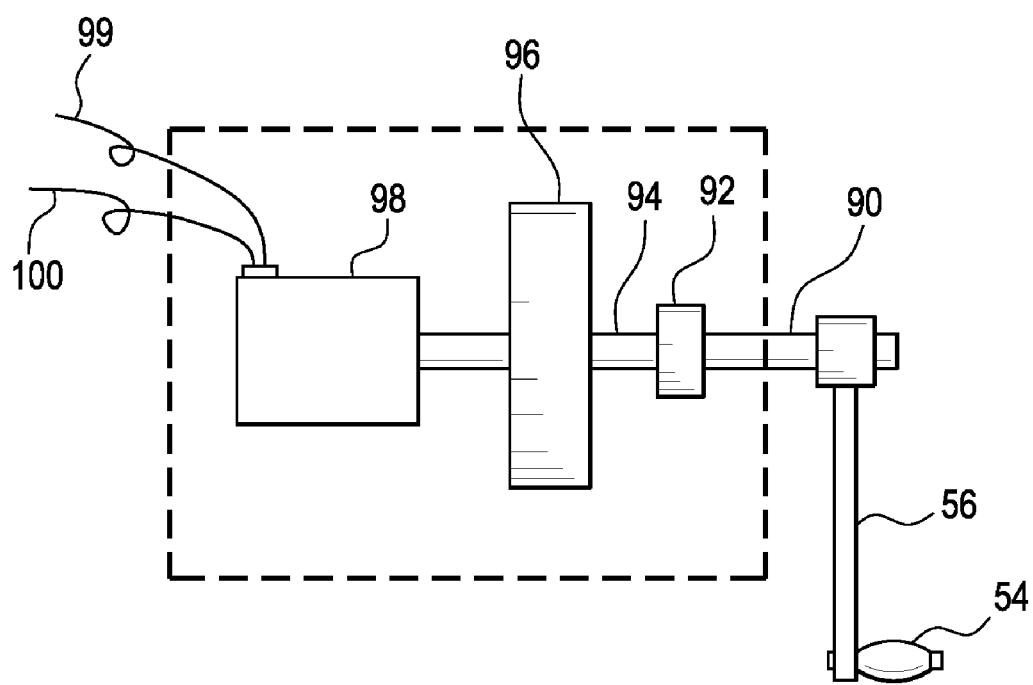
FIG. 8 is a schematic view, similar to FIG. 7, illustrating an alternative rapid recharging mechanism that bypasses the mechanical drive system and the armature recharger.

Referring to FIG. 8, it portrays yet another alternative for supplying operating or recharging current to cell phones. In this embodiment, crank 56 and crank handle 54 operate through the unidirectional clutch 92, its input and output shafts 90, 94 and flywheel 96 in the same way as described in connection with FIG. 7. However, included also in the container or housing for the latter three components is an electrical generator 98. The generator 98 supplies electric current directly to the cell phone battery pack in leads 44 and 46 and can be used to recharge the battery instead of the mechanisms shown in FIGS. 3-7.

The output shaft 94 from clutch 9) connects to a flywheel 96. An output shaft 98 of the flywheel connects either to the cam input shaft 58 of FIGS. 1 and 2, or to the axle 80 of wheel 82 in FIGS. 3 and 4. Thus, a user can rotate crank 56 and crank handle 54 to initiate engagement of dutch 92 which couples together the input and output shafts 90, 94, thus initiating rotation of the flywheel 96. After the flywheel is cranked up to its desired angular rotational speed, cranking can stop and the clutch 92 can be disengaged and enable the flywheel to run freely until its free wheeling capability runs down. During this period, there will be continuous oscillation of armature 26 in either of the drive systems of FIGS. 1 and 2 or 3 and 4. The user thereafter can repeat cranking up the flywheel into free wheeling operation for as many times as may be needed to restore either a partial or full recharge of the cell phone batteries.

While the foregoing description has focused on cell phones, the invention obviously may be applied to satellite phones or other portable communication devices that operate on batteries, charged capacitors, or equivalent storage components, which need and can be supplied with self generated operating electric current or periodic recharging of the storage components, in accordance with the invention.

The invention has been described in terms of its functional principles and several illustrative embodiments. Many variations or modifications in the illustrative embodiments will be obvious to those skilled in the art. Accordingly, it should be understood that all such variations and modifications are intended to be covered by the ensuing claims as well as all equivalents thereof.

The following is claimed:

1. A self powered cell phone which comprises:
   (a) at least one permanent magnet disposed within a cell phone housing and coupled to a pole piece of paramagnetic material which forms an air gap bridged by the flux of the magnet;
   (b) an armature supported to freely oscillate in opposite swinging motions and including at least one coil of conductive wire;
   (c) means for imparting relative motion to the armature such that the wire coil passes through the air gap to intersect the magnetic flux therein and generate electrical voltage and current; and
   (d) means for transporting the generated current to a storage component disposed within the cell phone housing.

2. A self powered cell phone according to claim 1 wherein the armature is elongated in shape, composed of nonmagnetic material and configured to include at least one wire coil at one of its ends, said armature being pivotally mounted to enable its wire coil end to freely swing in reciprocal opposite directions relative to the cell phone casing, thereby passing the wire coil through the magnetic flux in the air gap.

3. A self powered cell phone according to claim 2 wherein the armature is provided with a weight which causes it to remain in a vertical rest position when the cell phone casing undergoes reciprocal opposite motions that generate electric voltage and current.

4. A self powered cell phone according to claim 3 wherein the transporting means comprise conductive leads which conduct the generated current to input terminals of a battery pack containing at least one electric storage device.

5. A self powered cell phone according to claim 4 wherein the electric storage device is a rechargeable lithium ion, nickel metal hydride, nickel cadmium battery, or a capacitor.

6. A self powered cell phone according to claim 1 comprising two permanent magnets coupled to two respective pole pieces which form two respective air gaps bridged by the fluxes of the respective magnets.

7. A self powered cell phone according to claim 6 wherein an elongated armature includes a conductive wire coil at each of its ends and which is pivotally mounted to enable each of the wire coils to pass through one of the air gaps as the armature is induced to undergo reciprocal swinging motions in opposite directions.

8. A self powered cell phone according to claim 7 wherein the armature is provided with a weight which causes it to remain in a vertical rest position and to swing like a pendulum as it undergoes the reciprocal swinging motions in opposite directions.

9. A self powered cell phone according to claim 7 wherein the two magnets are disc-shaped and the wire coils are shaped as discs which generally match the shapes of the magnets.

10. A self powered cell phone according to claim 9 wherein each of the wire coils is connected to a pair of output terminals included on the armature1 with leads of conductive spring material connected to such terminals to undergo flexure and thereby accommodate the swinging motions of the armature and maintain electrical continuity.

11. A self powered cell phone according to claim 10 wherein the spring leads transport the electrical current from the output terminals of the wire coils, in parallel, to leads that conduct the current to the input terminals of storage batteries.

12. A method of providing self powered functionality to cell phones which comprises:
  (a) disposing at least one permanent magnet within a cell phone housing;
  (b) coupling the magnet to a pole piece of paramagnetic material and forming therewith an air gap which is bridged by the flux of the magnet;
  (c) providing an armature which includes at least one coil of conductive wire;
  (d) configuring and mounting the armature to freely oscillate in opposite swinging motions which pass the wire coil through the air gap to intersect the magnetic flux therein and generate electrical voltage and current; and
  (e) transporting the electric current to a storage component disposed within the cell phone housing.

13. A method according to claim 12 which includes providing a weight on the armature to enable it to act like a pendulum as it undergoes the relative motion which generates the electric current.

14. A method according to claim 12 which includes providing a rechargeable lithium ion, nickel metal hydride, nickel cadmium battery or a capacitor as the storage component.

15. A method according to claim 12 which includes disposing two permanent magnets within the cell phone housing, coupling both magnets to pole pieces of paramagnetic material and forming therewith two air gaps which are bridged by the fluxes of the respective magnets, providing an elongated armature which includes a conductive wire coil at each of its ends, and configuring and mounting the armature to freely oscillate in opposite swinging motions which pass each of the wire coils through one of the respective air gaps, thereby simultaneously generating electrical voltage and current in both coils.

16. A method according to claim 15 which includes providing a weight on the armature which enables it to act like a pendulum as it undergoes relative motion which generates the electric current.

17. A method according to claim 16 which includes providing a holder for the cell phone which can be worn or carried by a user to induce the coils on the armature to freely oscillate in opposite swinging motions through the air gaps, during walking or other activity by the user which creates such relative motion.

18. A mechanism for charging or recharging self powered cell phones which comprises:
  (a) a crank and an attached input shaft which are rotatable simultaneously in an angular direction;
  (b) means coupled to the input shaft for translating rotation thereof during cranking into reciprocal freely oscillating and pivoting motions of an input gear, in alternating opposite directions;
  (c) means for transmitting the pivoting motions of the input gear to a pivotable armature disposed within the housing of a self powered cell phone;
  (d) said armature including at least one coil of conductive material arranged to intersect the magnetic flux of a permanent magnet as the armature freely oscillates and pivots in alternate opposite directions in response to the pivoting motions provided by the transmitting means, whereby the input shaft and crank may be rotated to generate electric voltage and current from the interaction of the coil and the magnetic flux, such current being supplied to a storage component for charging or recharging the cell phone without need for an external electrical power source.

19. A mechanism according to claim 13 wherein the translating means comprises a cam eccentrically linked to the input shaft and a. spring biased cam follower rod abutting the cam at one end and attached to the input gear at the other end, whereby as the crank rotates the input shaft, the cam and cam follower impart reciprocal pivoting motions to the input gear in alternating opposite directions.

20. A mechanism according to claim 19 wherein the transmitting means comprises additional multiple gears driven by the input gear in ratios that provide a 10:1 mechanical advantage in the transmission of motion from the input gear to the armature.

21. A mechanism according to claim 13 wherein the armature includes at its opposite ends, two conductive coils of conductive material arranged to intersect the magnetic fluxes of two permanent magnets which bridge air spaces formed by combinations of the magnets with surrounding pole pieces.

22. A mechanism according to claim 13 wherein the armature is provided with a weight to cause it to hang in a vertical rest position and to swing like a pendulum while intersecting the magnetic flux of the permanent magnet.

23. A mechanism according to claim 18 wherein the translating means comprises a disc attached at its center to the input shaft and having a pin projecting outwardly from its opposite side at a location radially spaced from the center of the disc, said pin being disposed within an elongated slot of an elongated track attached at one end to the input gear, whereby as the crank rotates the input shaft, the pin and slotted track impart reciprocal pivoting motions to the input gear in alternating opposite directions.

24. A mechanism according to claim 23 wherein the transmitting means comprises additional multiple gears driven by the input gear in ratios that provide a 10:1 mechanical advantage in the transmission of motion from the input gear to the armature.

25. A mechanism according to claim 23 wherein the armature includes, at its opposite ends, two coils of conductive material, arranged to intersect the magnetic fluxes of two permanent magnets which bridge air spaces formed by combinations of the magnets with surrounding pole pieces.

26. A mechanism according to claim 23 wherein the armature is provided with a weight to hang in a vertical rest position and to swing like a pendulum while intersecting the magnetic flux.

27. A mechanism according to claim 19 wherein the input shaft is connected to a one-way clutch which engages upon rotation of the input shaft by the crank and which disengages upon cessation of the input shaft's rotation, the output side of the clutch being connected to the input shaft of a flywheel the output of which is linked to the cam input shaft that drives the cam, whereby a user may crank up the flywheel into free running condition and thereby charge or recharge the cell phone's batteries without the need for continuously cranking and rotating the input shaft.

28. A mechanism according to claim 23 wherein the input shaft is connected to a one-way clutch which engages upon rotation of the input shaft by the crank and which disengages upon cessation of the input shaft's rotation, the output side of the clutch being connected to the input shaft of a flywheel the output of which is linked to the axle of the disc that drives the slotted track, whereby a user may crank up the flywheel into free running condition and thereby charge or recharge the cell phone's batteries without the need for continuously cranking and rotating the input shaft.

29. A mechanism for charging or recharging self powered cell phones which comprises:

(a) a crank and an attached input shaft which are rotatable simultaneously in an angular direction;
(b) a one-way clutch, connected to the input shaft, which engages upon rotation of the input shaft by the crank and which disengages upon cessation of the input shaft's rotation, the output side of the clutch being connected to an input shaft of a flywheel which also has an output shaft; and
(c) an electrical generator the input shaft of which is connected to the output shaft of the flywheel;

whereby upon rotation of the crank and the flywheel, followed by disengagement of the clutch, the flywheel becomes freewheeling and causes the generator to continue to generate electrical energy so that the electrical output of the generator can be connected directly to the electrical input terminals of a battery pack, capacitor or other storage component to enable directly charging or recharging the cell phone.

* * * * *